United States Patent
Krishnaswami et al.

(10) Patent No.: US 6,618,735 B1
(45) Date of Patent: Sep. 9, 2003

(54) SYSTEM AND METHOD FOR PROTECTING SHARED SYSTEM FILES

(75) Inventors: Brijesh S. Krishnaswami, Bellevue, WA (US); Ashish Sikka, Bellevue, WA (US); Anil Francis Thomas, Redmond, WA (US); Hauroon M. A. Jamal, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/607,738

(22) Filed: Jun. 30, 2000

Related U.S. Application Data

(60) Provisional application No. 60/141,757, filed on Jun. 30, 1999.

(51) Int. Cl.[7] .......................... G06F 15/16; G06F 17/00; G06F 17/30

(52) U.S. Cl. ......................... 707/203; 707/1; 707/100; 707/200

(58) Field of Search ............................... 707/1–10, 100, 707/203; 711/165

(56) References Cited

U.S. PATENT DOCUMENTS 5,257,368 A  * 10/1993  Benson et al. ................. 707/1
5,276,860 A     1/1994  Fortier et al.

(List continued on next page.)

FOREIGN PATENT DOCUMENTS

| EP | 0625752 | 11/1994 |
| GB | 2329046 | 3/1999 |
| WO | 9912101 | 3/1999 |

OTHER PUBLICATIONS

Netscape Communications Corporation: "NetHelp 2.0 Authoring Guide" Nethelp 2.0 SDK Documentation, 'Online! Sep. 3, 1997, pp. 1–21, XP002155041.

C. Levin: "Web Repair Shops" PC Magazine: Trends 'Online! Aug. 11, 1998, pp. 1–3, XP002155042.

Netscape Communications Corporation: "Establishing trust for downloaded software" Netscape Object Signing, 'Online! Jul. 2, 1997, pp. 1–18, XP002155043.

Netscape Communications Corporation: "SmartUpdate Developer's Guide" Devedge Online Documentation, 'Online! Mar. 11, 1999, pp. 1–83, XP002155044.

R. Binns, J. Winstead: "A standard for Linux packages and version numbering" Linux Specification Document, 'Online! Aug. 24, 1993, XP002155045.

"Safe Installation of Object–Oriented Class Libraries Common to Multiple Software Products" IBM Technical Disclosure Bulletin, US, IBM Corp. New York, vol. 37 No. 2B, Feb. 1, 1994, pp. 407–409.

(List continued on next page.)

Primary Examiner—Safet Metjahic
Assistant Examiner—Marcin Filipczyk
(74) Attorney, Agent, or Firm—Leydig, Voit & Mayer, Ltd.

(57) ABSTRACT

A system and method for protecting shared system files enhances system stability by preventing system files shared by applications, such as DLL files, from being overwritten with invalid files during installation or update of applications or by user actions. A monitoring component monitors changes to the system files. When the monitoring component detects that a protected system file is being changed, it saves a copy of the original file and informs a file protection service of the change. The file protection service checks the modified file to determine whether it is valid. If the modified file is invalid, the system file is restored to its original contents using the copy saved by the monitoring component. Unauthorized importation of system files by application installers or update packages is prevented by requiring the use of a certificate issued by a party with proper authority.

16 Claims, 4 Drawing Sheets

U.S. PATENT DOCUMENTS

| | | |
|---|---|---|
| 5,367,667 A | 11/1994 | Wahlquist et al. |
| 5,524,190 A | 6/1996 | Schaeffer et al. |
| 5,642,417 A * | 6/1997 | Stringer .................... 717/174 |
| 5,715,462 A | 2/1998 | Iwamoto et al. |
| 5,724,578 A * | 3/1998 | Morinaga et al. ........... 707/100 |
| 6,366,988 B1 * | 4/2002 | Skiba et al. ................ 711/165 |

OTHER PUBLICATIONS

Collinson: "Putting old software back together again" EXE vol. 13, No. 6, Nov. 1998 pp. 45–48.

Iffland et al: "ISDN Applications: Their Identification and Development" IEEE Network: The Magazine of Computer Communications, US, IEEE INC New York, vol. 3, No. 6, Sep. 1, 1989 pp. 6–11.

* cited by examiner

```
<PCHealthProtect>
....
....
 <sfp>
   <rec>%winsys%\winsock.dll</rec>
   <rec>%winsys%\mfc42.dll</rec>
   <rec>%winsys%\CatRoot\pchealth.cat</rec>
 </sfp>
....
....
</PCHealthProtect>
```

| SFP Database | | |
|---|---|---|
| File Name | Catalog | Version |
| Winsock.dll | Mill.cat | 6.0 |
| Winsock.dll | MillSP1.cat | 7.0 |
| Msvcrt.dll | MillSP1.cat | 9.0 |
| Oleaut32.dll | Mill.cat | 6.0 |

110

SYSTEM AND METHOD FOR PROTECTING SHARED SYSTEM FILES

CROSS REFERENCE TO RELATED APPLICATIONS

This application claims the benefit of provisional patent application No. 60/141,757, filed Jun. 30, 1999.

TECHNICAL FIELD OF THE INVENTION

This invention relates generally to computer operating systems, and more particularly to the protection of critical operating system files shared by different applications.

BACKGROUND OF THE INVENTION

A modern computer operating system is a highly complex program that may have multiple layers in its architecture and comprise myriads of files for serving different functions. Some of the operating system components are designed to provide various system functions to applications installed on the system and are thus "shared" by the applications. For instance, in the WINDOWS operating systems of Microsoft Corporation, there are many files in the form of dynamic-link library (DLL) files that application programs can link to and call functions implemented therein during runtime.

Because shared operating system files such as DLL files are used by numerous different applications, quite a few applications may stop working if one of those shared system files is corrupted, inadvertently overwritten, or otherwise destroyed. Invalid modifications to the shared system files can therefore become a serious cause of system instability. For instance, the WINDOWS operating systems allow the installer program of a third party application to add all files needed by the application to the system during installation of that application. Those files added during installation often include DLL files that are shared by other applications. The ability of an installer to modify system files enables the installer to ensure that the application will have all the files it needs to perform as designed. It, however, also exposes the operating system to significant problems of system instability, because the installer can also make improper changes to shared system files needed by other applications. For instance, the installer of an older application may overwrite an existing DLL file on the system with an older version of that file that does not work with newer applications. Some software vendors may also attempt to overwrite selected DLL files with some proprietary versions of those files that are incompatible with other applications. As operating systems become more complex and more applications are available, the risk of having shared system files overwritten with invalid versions during application installation or update becomes increasingly higher. System instability due to improper changes to shared operating system files has recently become a very significant problem experienced by users and an important factor in comparing operating systems.

SUMMARY OF THE INVENTION

In view of the foregoing, the present invention provides a system and method for protecting shared system files that prevents system files, such as DLL files, shared by applications from being improperly modified during installation or update of applications or by user actions. To protect the shared system files, the operating system is provided with a monitoring component for monitoring changes to the system files. When a protected system file is being changed, the monitoring component saves a copy of the original file and informs a system file protection (SFP) service of the change. The SFP service checks the modified file to determine whether it is valid. If the modified file is invalid, the system file is restored to its original contents using the copy saved by the monitor component. Unauthorized importation of system files by application installers or update packages is also prevented by requiring a valid certificate for the package presenting the system files to be installed.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is an exemplary XML file used in the embodiment of FIG. 2 for identifying system files to be protected;

FIG. 4 is a schematic diagram of a data structure in a system file protection (SFP) database for providing information regarding protected system files.

DETAILED DESCRIPTION OF THE INVENTION

Figure 1:
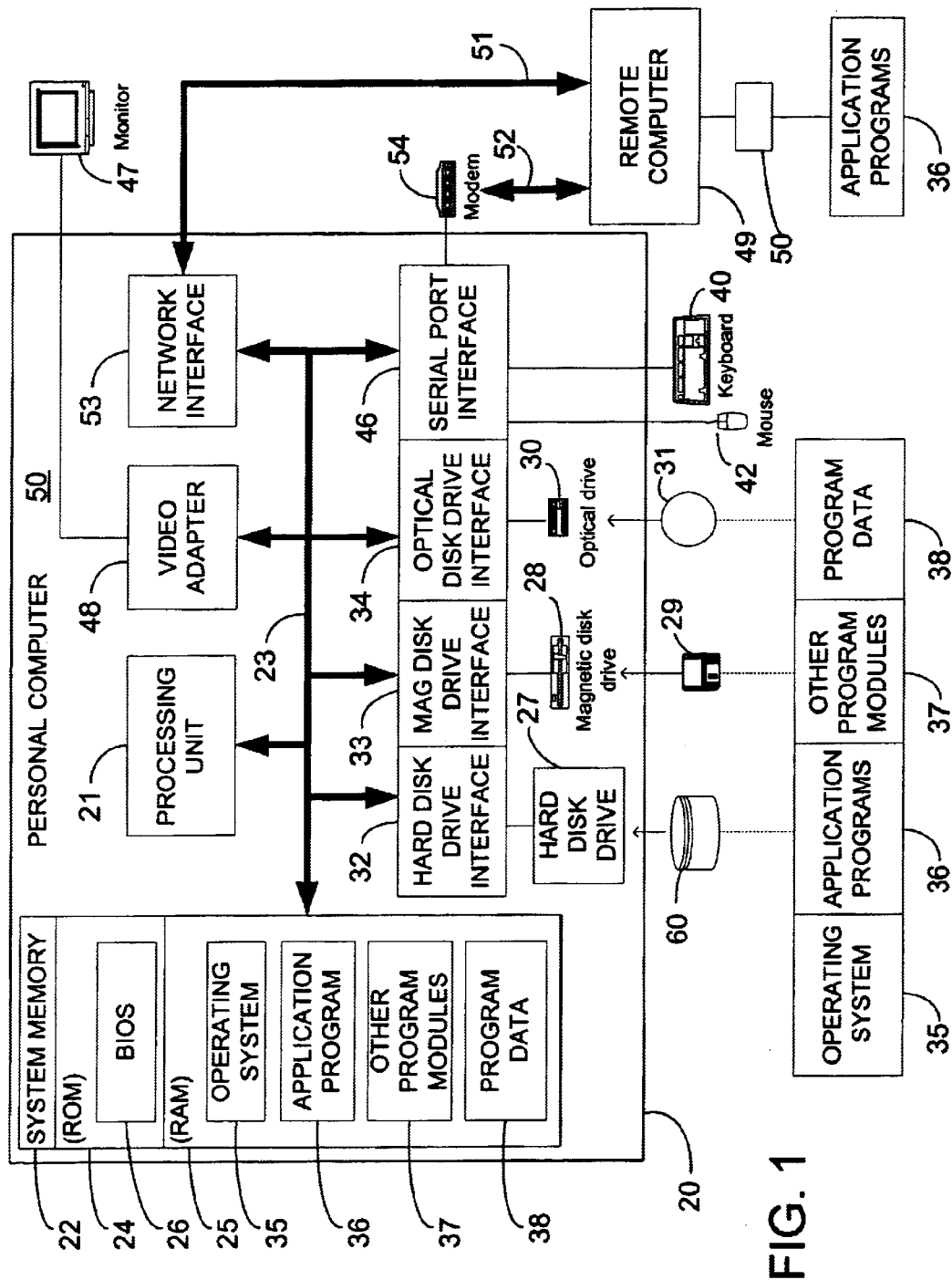
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of kill in the art will appreciate that various of the acts and operation described hereinafter may also be implemented in hardware.

Figure 2:
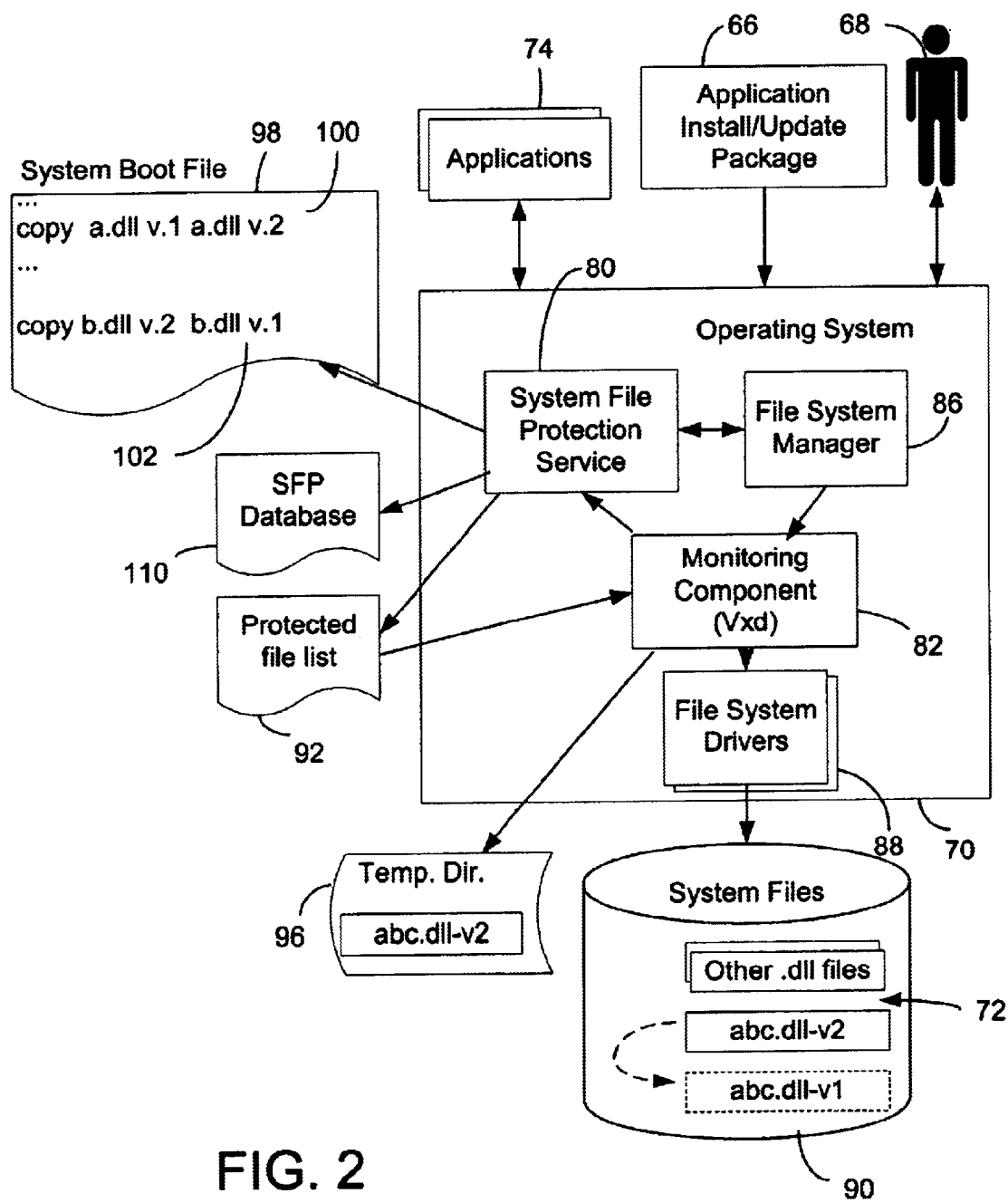
FIG. 2 is a schematic diagram showing an embodiment of an operating system having components for protecting shared system files in accordance with the invention.

Referring now to FIG. 2, the present invention is directed to an effective way to protect shared operating system files, such as DLL files, from being inadvertently overwritten by invalid versions or otherwise incorrectly modified. In a preferred embodiment described below, the operating system may be a WINDOWS operating system of the Microsoft Corporation, and DLL files are used as an example of system files that are shared by applications and to be protected. It will be appreciated, however, that the system file protection in accordance with the invention may be used with other operating systems that have shared system files as well as for protecting other types of shared system files.

As show in FIG. 2, the operating system 70 has a plurality of dynamic-link library (DLL) files 72 that may be called by and dynamically linked to applications 74 during execution to provide various system functions. It is typical for a DLL file to have been updated multiple times to provide enhanced features or remove bugs, so that there may be different versions of the given DLL file in existence. To keep track of the different versions of the DLL files, each DLL file in the illustrated embodiment is identified not only by its name but also by an associated version number.

As described earlier, one major cause of system instability is that the installer of an application installation or update package 66 may attempt to overwrite existing shared system files with versions that are inoperable with other applications. For instance, an older application may try to overwrite a DLL file with an older version, or an application may try to overwrite a DLL file with a proprietary version incompatible with other applications. It will be appreciated that application installation or update is only one of the scenarios in which shared system files may be improperly overwritten or otherwise corrupted or destroyed. For instance, the shared system files may be improperly modified or deleted by actions of a user 68. As will become clear in view of the following description, the system file protection according to the invention is also effective against such user actions as well as other causes of unauthorized modification of protected system files.

In accordance with the invention, the protection of the shared system files are performed in two related aspects.

First, system files already existing on the system are protected from being overwritten with invalid files. To that end, system file changes are monitored. When a protected system file is overwritten by an invalid file or otherwise improperly changed, the invalid change is detected and undone to restore the original file. Second, unauthorized importation of system files during application installation or updates are disallowed to prevent invalid system files from being added to the system.

Turning to the first aspect, in the illustrated embodiment, the protection of existing system files from unauthorized changes is accomplished by the cooperation of a file-change monitoring component and a system file protection (SFP) service component 80. The monitoring component, which in the illustrated embodiment is shown as a virtual device driver (Vxd) 82, is responsible for detecting changes to the protected system files and notifying the SFP service 80 of the changes. The SFP service 80 can then undo the changes if they are determined to be invalid. As shown in FIG. 2, the Vxd 82 is inserted between the file system manager 86 and the file system drivers 88 of the operating system 70. With the Vxd 82 in this position, all calls from the system file manager 86 to the system file drivers 88 for operations on the files stored in the system memory 90 will go through the Vxd. In this way, the Vxd 82 can track all changes to the system files. A file change may involve overwriting the file with another file, modifying certain data in the file, or deleting the file.

When the Vxd 82 receives a call to change a file, it does not immediately pass the call to the file system driver 88 responsible for that file. Instead, the Vxd first checks a list 92 of protected system files to see whether that file to be changed is one of the protected system files, which in this embodiment include DLL files. If that file is a protected system file, the Vxd 82 first makes a copy of the original file and stores that copy in a temporary directory 96 of the system before allowing the changes to be made. The Vxd 82 then informs the SFP service 80 that a protected file has been changed. In the illustrated embodiment, the communication between the Vxd 82 and the SFP service 80 is by means of WINDOWS messages, and the SFP service is running in a message loop.

By way of example, as shown in FIG. 2, the system file being changed may be a file named "abc.dll" with a version number of 2. When the Vxd 82 receives a call to overwrite this file with abc.dll, version 1, it checks the list 92 of protected files and determines that this file is to be protected. The Vxd 82 than saves a copy of abc.dll, v.2 in the temporary directory 96. The file abc.dll, v.2 in the system memory 90 is then replaced by abc.dll, v.1.

When the SFP service 80 receives a notice from the Vxd 82 that a protected system file has been changed, it checks whether the change should be allowed. In the case that the original file is overwritten with a new file, the SFP service determines whether the new file is valid. If the new file is invalid, the SFP service 80 replaces it with the copy of the original file saved in the temporary directory by the Vxd 82, thereby undoing the change.

In some cases, the intended change to a protected file is not made instantly but postponed to be carried out later. For instance, if the shared system file is constantly being used so that a write operation cannot be performed on it, the file system manager may decide to put in the system boot file 98 a write instruction 100 to overwrite the target system file with the new file. The next time the system is booted up, the write instruction in the boot file will be executed to effect the changes. In that scenario, if the SFP service 80 determines that the new file is invalid, it simply removes the write instruction 100 from the system boot file, thereby preventing the invalid changes from taking place.

In a related scenario, the overwriting of the original system file with an invalid version may have already taken place when the SFP service 80 determines that the new file is invalid, but the continuous use of that system file by applications inhibits the SFP service from restoring the original file. In that case, the SFP service 80 may decide to put a write instruction 102 in the system boot file 98 to overwrite the changed system file with the copy of the original version saved by the Vxd 82. Thus, during the next system boot-up, the system file will be restored to its original form.

In an implemented embodiment, the list 92 of protected system files checked by the Vxd 82 is contained in a file in the extensible Markup Language (XML) format. For illustration purposes, FIG. 3 shows a simplified example of such an XML file. In this example, the XML file 106 is also used to identify files for other system administration purposes. The shared system files to be protected are identified in the section 108 with the "SFP" tag. For simplicity of illustration, the "SFP" section of the XML file 106 in FIG. 3 contains only two entries. It will be appreciated, however, that in a real implementation these may be many entries in this section for identifying protected system directories and files. In this embodiment, each statement in this "SFP" section identifies a system file (including the directory it is in) to be protected. The XML file is provided with the operating system and may be updated through the use of update packages when files need to be added or removed from the list. When a system file is open for a write operation, the Vxd 82 checks the XML file to see whether the file appears in the "SFP" section of the file. If so, the system file is to be protected, and the Vxd makes a copy of the system file before any change is made to it.

To enable the SFP service 80 to determine whether a modified system file is valid, the SFP service maintains a system file protection (SFP) database 110 that identifies shared system files that have been installed on the system. For illustration purposes, an example of the SFP database 110 is shown in FIG. 4 in the form of a table. As will be described in greater detail below in connection with the control of importation of system files, system files to be added by an application installer or update package are preferably identified in one or more catalogs presented to the operating system. As shown in FIG. 4, each entry in the SFP database 110 stores the name of a protected DLL file, the catalog in which the file was presented, as well as the version number of the file as identified in that catalogue. If a given file name is listed on multiple catalogs, there may be multiple entries with the same file name. Each of the entries with the same file name would, however, have a different version number and/or catalog name associated therewith. For instance, in the illustrated example of FIG. 4, there are two entries for Winsock.dll, which are associated with the catalogs Mill.cat and MillSP1.cat and have version numbers 6.0 and 7.0, respectively.

In accordance with an aspect of a preferred embodiment, a protected system file is identified not only by its file name and version number but also by a hash value. The hash value of a given file is generated by applying a hashing function to the contents of the file. The hashing function is such that even changing a single bit in the file will likely result in a different hash value. At the same time, the contents of the file cannot be derived backward from the hash value. As described below, identifying a protected system file with its hash value allows a determination of whether its contents have been changed even though its name and version number remain the same. In a preferred embodiment, the hash values of protected system files are stored in the corresponding catalogs that were used to install the files on the system, and the catalogs are kept in a catalog store 140 (FIG. 5) on the system.

When the SFP service 80 receives a message from the Vxd 82 that a protected file has been modified, it queries the SFP database 110 for all entries therein that have the same file name as the one modified. The SFP service then determines whether the "new file" is valid based on the information from the database. The new file is deemed valid if (1) it has the same version number as the highest version number of the entries for that file in the SFP database, and (2) it has the correct hash value for that version. For the second comparison, the SFP service 80 reads the SFP database entry for the highest version to identify the catalog associated therewith, and reads that catalog in the catalog store 140 to obtain the hash value for that version. Requiring the new file to have the right hash prevents the possibility that the original file is overwritten with a file with the same name and the right version number but has been altered to have invalid contents.

Turning now to the second aspect of the file protection according to the invention, the importation of system files is closely monitored, and the files are allowed to be added to the system only when they are accompanied with an indication of proper authorization. In a preferred embodiment, the importation of system files may be through either application installation or application update packages. In either case, the system files to be put on the system are presented in catalogs. Because the operation of installing system files identified in catalogs is the same for both installing applications and installing update packages, the following description will describe only the case of installing an update package. In this regard, it will be appreciated that an application installation package may be viewed as one type of update package.

Figure 5:
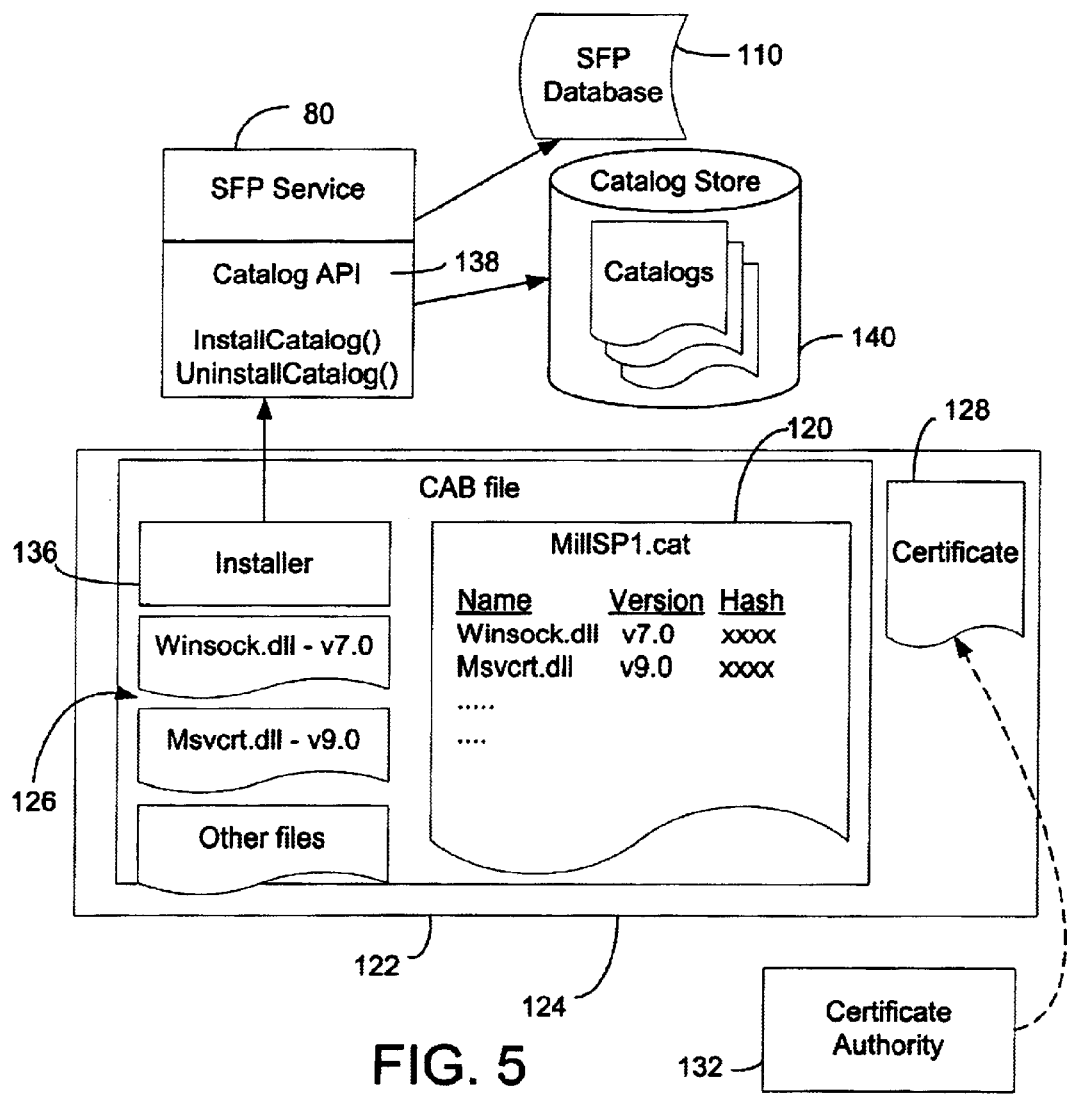
FIG. 5 is a schematic diagram showing controlled importation of system files presented by an installation/update package based on the presentation of a valid certificate.

For illustration purposes, FIG. 5 shows an example of a catalog 120. The catalog may have multiple entries, with each entry identifying a system file to be put on the system. The entry provides, for example, the name of the file, the hash value of that file, and the version number of the file. The entry may also contain other data pertaining to the file. In the illustrated embodiment, the catalog is part of an update package 122 to be installed on system.

To prevent invalid files from being imported to the system and used to overwrite shared system files, the update package 122 is required to show proper authorization before its catalog and the associated files 126 will be accepted. In a preferred embodiment, this authorization check is by means of a certificate 128 included with the update package 122. This certificate 128 may be issued by a proper certification authority 132 according to the well-known certificate-based authentication techniques to vouch for the authenticity and integrity of the package. The certification authority 132 issuing the certificate may be, for example, the maker of the operating system or any other party entrusted with the responsibility to certify properly constructed installation or update packages. By requiring that any installation of protected system files be accompanied with a valid certificate, the authority 132 issuing that certificate can check that all the system files presented in the package are valid.

Typically, the update package 122 is in the form of a compressed cabinet (CAB) file 124 that contains an installer 136, one or more catalogs 120, and all the system files and application files 126 to be added to the system. When the operating system is presented with the CAB file, it first checks whether the certificate 128 enclosed in the package is issued by a proper authority. If so, the certificate is used to verify that the integrity of the files, i.e., they have not been tampered with. After authenticating the certificate, the files compressed in the CAB file are extracted. The installer 136 in the package is then allowed to install the catalog and the files listed therein as described above.

To install the system files identified in the catalog 120, the system component installer 136 of the update package 122 calls a Catalog application programming interface (API) 138 of the operating system. The Catalog API 138 exposes an InstallCatalog function and an UninstallCatalog function. To install the system files identified in the catalog 120, the installer 136 calls the InstallCatalog function and presents the catalog. In response, the SFP service 80 enumerates the entries in the catalog 120, adds them to the SFP database described above, and copies the system files to their proper directories. The catalog 120 is also added to the catalog store 140. Later, if the SFP database 110 is somehow corrupted, it can be rebuilt by enumerating all the catalogs in the catalog store 140 to identify the protected system files that have been installed on the system.

When an installer of an update package wants to remove a catalog, it calls the UninstallCatalog function of the Catalog API 138. In response to the uninstall request, the SFP service 80 queries the SFP database 110 for all the entries in the database that are associated with the given catalog, and removes those entries from the database.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method of protecting shared system files of a computer system, comprising:
    monitoring calls for making changes to system files;
    detecting a change being made to a shared system file that is to be protected, the change including overwriting with a replacement version of the shared system file;
    saving a copy of the shared system file before the change is made to the shared system file;
    determining whether the change to the shared system file is valid, including comparing a version number of the replacement version of the shared system file with a highest version of the shared system file installed on the computer system and comparing a hash value of the replacement version with a hash value of said highest version installed on the computer system; and
    if the change is invalid, undoing the change using the saved copy of the shared system file.

2. A computer-readable medium having computer-executable instructions for performing the method of claim 1.

3. A method as in claim 1, wherein the comparing includes retrieving data regarding the highest version of the shared system file from a database containing data identifying protected system files installed on the computer system.

4. A method as in claim 3, wherein the comparing of hash values includes retrieving from the database an identification of an installation catalog for the shared system file and accessing the installation catalog to obtain the hash value of said highest version installed on the computer system.

5. A computer-readable medium having computer-executable instructions for performing the method of claim 4.

6. A method as in claim 1, wherein the undoing includes overwriting the replacement version with the saved copy of the shared system file.

7. A method as in claim 1, wherein the undoing including inserting an instruction in a system boot file to overwrite the replacement version with the saved copy of the shared file system.

8. A method as in claim 1, wherein the shared computer files are dynamic-link library (DLL) files.

9. A method as in claim 1, wherein the detecting includes referencing a list of protected system files to determine whether the shared system file being changed is to be protected.

10. A method of updating system files of a computer system, comprising:
  monitoring calls for making changes to system files;
  detecting a change being made to a shared system file that is to be protected;
  saving a copy of the shared system file before the change is made to the shared system file;
  determining whether the change to the shared system file is valid;
  if the change is invalid, undoing the change using the saved copy of the shared system file;
  receiving an update package;
  authenticating a certificate of the update package;
  extracting an update version of a shared system file included in the update package;
  overwriting an existing version of the shared system file on the computer system with the update version; and
  updating a database for identifying installed protected system files on the computer system to include the update version of the shared system file.

11. A computer-readable medium having computer-executable instructions for performing the method of claim 10.

12. A computer-readable medium having computer executable components for protecting shared system files of a computer system, comprising:
  a monitoring component, and
  a file protection service component,
  the monitoring component monitoring changes to system files and, upon detecting a change being made to a protected shared system file by overwriting with a replacement version of the protected shared system file, saving a copy of the protected shared system file before the change is made and notifying the file protection service component, the service component in response to the notice determining whether the change is valid and, if the change is not valid, undoing the change using the saved copy of the protected shared system file, wherein the file protection service component maintains an installed file database identifying protected system files installed on the computer system, and references the installed file database in determining whether the change to the protected shared system file is valid by comparing a version number and a hash value of a highest version of the protected shared system file installed on the computer system with a version number and a hash value of the replacement version of the protected shared system file.

13. A computer-readable medium as in claim 12, wherein the monitoring component is placed above file system drivers to monitor calls to the file system drivers to modify system files.

14. A computer-readable medium as in claim 12, wherein the file protection service component further maintains a protected file list, and the monitoring component identifies the protected shared system file in the protected file list to upon detecting the change being made to the protected shared system file.

15. A computer-readable medium having computer executable components for updating shared system files of a computer system, comprising:
  a monitoring component, and
  a file protection service component,
  the monitoring component monitoring changes to system files and, upon detecting a change being made to a protected shared system file, saving a copy of the protected shared system file before the change is made and notifying the file protection service component, the service component in response to the notice determining whether the change is valid and, if the change is not valid, undoing the change using the saved copy of the protected shared system file,
  wherein the file protection service component is further programmed to perform:
  receiving an update package;
  authenticating a certificate of the update package;
  extracting an update version of a shared system file included in the update package;
  overwriting an existing version of the shared system file on the computer system with the update version; and
  updating the installed file database to include the update version of the shared system file.

16. A computer-readable medium as in claim 15, wherein the protected shared system file is a dynamic-link library (DLL) file.

* * * * *

UNITED STATES PATENT AND TRADEMARK OFFICE
CERTIFICATE OF CORRECTION

PATENT NO. : 6,618,735 B1
DATED : September 9, 2003
INVENTOR(S) : Krishnaswami et al.

It is certified that error appears in the above-identified patent and that said Letters Patent is hereby corrected as shown below:

Title page,
Item [*], Notice, Extention should read -- 429 days. --.

Column 2,
Line 51, "hand held" should read -- hand-held --.

Column 5,
Line 47, "abc.dI1" should read -- abc.dll --.

Signed and Sealed this

Sixth Day of July, 2004

JON W. DUDAS
*Acting Director of the United States Patent and Trademark Office*